United States Patent [19]
Matthias

[11] Patent Number: 5,611,649
[45] Date of Patent: Mar. 18, 1997

[54] ELEMENTS FACED WITH SUPERHARD MATERIAL

[75] Inventor: Terry R. Matthias, Longlevens, England

[73] Assignee: Camco Drilling Group Limited, Stonehouse, England

[21] Appl. No.: 491,537

[22] Filed: Jun. 16, 1995

[30] Foreign Application Priority Data

Jun. 18, 1994 [GB] United Kingdom .................... 9412247

[51] Int. Cl.⁶ .................................................... B23B 27/14
[52] U.S. Cl. ........................ 407/118; 407/119; 175/428; 408/144
[58] Field of Search .................................. 407/118, 119; 408/144, 145; 175/420.1, 420.2, 432, 434, 435, 428; 51/293

[56] References Cited

U.S. PATENT DOCUMENTS

| | | | |
|---|---|---|---|
| 4,629,373 | 12/1986 | Hall | 407/118 |
| 4,726,718 | 2/1988 | Meskin et al. | 408/145 |
| 4,784,023 | 11/1988 | Dennis | 76/108.2 |
| 5,007,207 | 4/1991 | Phaal | 51/204 |
| 5,011,515 | 4/1991 | Frushour | 407/118 X |
| 5,120,327 | 6/1992 | Dennis | 51/293 |
| 5,351,772 | 10/1994 | Smith | 175/428 |
| 5,355,969 | 10/1994 | Hardy et al. | 175/432 |

FOREIGN PATENT DOCUMENTS

| | | | |
|---|---|---|---|
| 5154704 | 6/1993 | Japan | 408/145 |
| 2275068 | 8/1994 | United Kingdom . | |
| 2283773 | 5/1995 | United Kingdom . | |

*Primary Examiner*—M. Rachuba
*Assistant Examiner*—Henry W. H. Tsai

[57] ABSTRACT

A preform element, suitable for use as a cutting element on a rotary drill bit, includes a polycrystalline diamond facing table bonded to a tungsten carbide substrate, the rear surface of the facing table being formed with an array of elongate ribs which project from the facing table into the substrate. The array of ribs includes a plurality of pairs of ribs which extend inwardly away from the periphery of the facing table, each pair of ribs being in a generally V-shaped formation so that the ribs diverge as they extend inwardly away from said periphery. Adjacent pairs of ribs may intersect to provide a generally star-shaped formation.

12 Claims, 3 Drawing Sheets

ELEMENTS FACED WITH SUPERHARD MATERIAL

BACKGROUND TO THE INVENTION

The invention relates to elements faced with superhard material, and particularly to preform elements comprising a facing table of superhard material having a front face, a peripheral surface, and a rear surface bonded to a substrate of material which is less hard than the superhard material. Preform elements of this kind are often used as curing elements on rotary drag-type drill bits, and the present invention will be particularly described in relation to such use. However, the invention is not restricted to curing elements for this particular use, and may relate to preform elements for other purposes. For example, elements faced with superhard material, of the kind referred to, may also be employed in work piece-shaping tools, high pressure nozzles, wire-drawing dies, bearings and other parts subject to sliding wear, as well as elements subject to percussive loads as may be the case in tappets, cams, cam followers, and similar devices in which a surface of high wear resistance is required.

Preform elements used as curing elements in rotary drill bits usually have a facing table of polycrystalline diamond, although other superhard materials are available, such as cubic boron nitride and amorphous diamond-like carbon (ADLC). The substrate of less hard material is often formed from cemented tungsten carbide, and the facing table and substrate are bonded together during formation of the element in a high pressure, high temperature forming press. This forming process is well known and will not be described in detail.

Each preform cutting element may be mounted on a carrier in the form of a generally cylindrical stud or post received in a socket in the body of the drill bit. The carrier is often formed from cemented tungsten carbide, the surface of the substrate being brazed to a surface on the carrier, for example by a process known as "LS bonding". Alternatively, the substrate itself may be of sufficient thickness as to provide, in effect, a cylindrical stud which is sufficiently long to be directly received in a socket in the bit body, without being brazed to a carrier. The bit body itself may be machined from metal, usually steel, or may be molded using a powder metallurgy process.

Such cutting elements are subjected to extremes of temperature during formation and mounting on the bit body, and are also subjected to high temperatures and heavy loads when the drill is in use down a borehole. It is found that as a result of such conditions spalling and delamination of the superhard facing table can occur, that is to say the separation and loss of the diamond or other superhard material over the cutting surface of the table. This may also occur in preform elements used for other purposes, and particularly where the elements are subjected to repetitive percussive loads, as in tappets and cam mechanisms.

Commonly, in preform elements of the above type the interface between the superhard table and the substrate has usually been flat and planar. However, particularly in cutting elements for drill bits, attempts have been made to improve the bond between the superhard facing table and the substrate by configuring the rear face of the facing table so as to provide a degree of mechanical interlocking between the facing table and substrate. One such arrangement is shown in U.S. Pat. No. 5,120,327 where the rear surface of the facing table is integrally formed with a plurality of identical spaced apart parallel ridges of constant depth. The facing table also includes a peripheral ring of greater thickness, the extremities of the parallel ridges intersecting the surrounding ting. U.S. Pat. No. 4,784,023 illustrates a similar arrangement but without the peripheral ring.

While such cutting elements have met with some success in the field, they suffer from certain serious disadvantages. Since the ridges on the facing table are parallel and extend from one side of the cutting element to the other, it is necessary to ensure that the cutting element is mounted on the drill bit in the correct rotational orientation, since it is desirable that the cutting edge, i.e. the part of the periphery of the facing table which engages the formation during drilling, extends across the ends of the ridges. This leads to difficulties, during manufacture, in mounting such cutting elements in the correct orientation on the posts, since many posts are not mounted on the bit body so as to be perpendicular to the formation. Thus the required orientation of the cutting element on the post depends upon the ultimate orientation and alignment of the post when mounted on the bit body.

One of the main purposes of providing the above-mentioned ridges on the facing table is to improve the bonding between the facing table and the substrate by accommodating the distortion which results from heating of the cutting assembly during manufacture, both during formation of the cutting element itself, and in its subsequent bonding onto a carrier. Such distortion results from the difference in coefficient of thermal expansion between the superhard material of the facing table and the less hard material of the substrate. Since the cutting elements of the kind referred to above are not symmetrical about the central axis, the distortion as a result of heating is also not symmetrical. Thus little distortion may be found along the plane of the ridges, but considerable distortion may be evident perpendicular to the ridges. This can therefore lead to splitting along the line of the ridges when the cutting element is subjected to high temperatures, for example when bonding to a carrier.

Given the difference in properties between the superhard material and the material of the substrate, a stress condition is always established between the facing table and the substrate. This stress is generally radial and the intensity of the stress increases with distance from the center of the cutter. The prior art cutting elements take no account of this and provide no arrangement for accommodating the increasing stress at the outer radial positions. The opposite extremities of the parallel ridges provide some reinforcement of the outer peripheral ting on two diametrically opposed portions of the peripheral ring but provide no such support for the opposed portions of the ring which lie at opposite ends of a diameter at fight angles to the ridges.

SUMMARY OF THE INVENTION

According to the invention there is provided a preform element including a facing table of superhard material having a front face, a periphery, and a rear surface bonded to a substrate which is less hard than the superhard material, the rear surface of the facing table being formed with an array of elongate ribs which project from the facing table into the substrate, the array comprising a plurality of pairs of ribs extending inwardly away from the periphery of the facing table, the ribs of each pair diverging as they extend inwardly away from said periphery.

Preferably the ribs of each pair are arranged in a generally V-shape formation, the apex of the V-shape being located adjacent the periphery of the facing table. Said pairs of diverging ribs may be spaced substantially equally apart around at least a part of the periphery of the facing table, and preferably around the whole periphery.

The ribs of each pair of diverging ribs may be substantially straight, or may curve away from one another as they extend inwardly from the periphery of the facing table. Each rib of a pair of diverging ribs may join, or extend across, a rib of an adjacent pair of ribs. At least one rib of one pair of diverging ribs may be joined end-to-end with a rib of another pair of diverging ribs to form a continuous rib extending across the facing table.

In any of the above arrangements there may be provided, between two adjacent pairs of diverging ribs, one or more intermediate ribs, not forming part of a pair of diverging ribs, which extend inwardly away from the periphery of the facing table. Said intermediate ribs may extend substantially normally to the periphery of the facing table. At least one said intermediate ribs may join a rib of an adjacent pair of diverging ribs.

There may be provided, within said array of pairs of diverging ribs, one or more similar arrays of pairs of diverging ribs. Preferably an inner area of the rear surface of the facing table is free of ribs. In specific embodiments there may be provided eight or sixteen pairs of diverging ribs spaced substantially equally apart around the periphery of the facing table.

DETAILED DESCRIPTION OF THE PREFERRED EMBODIMENTS

Figure 1:
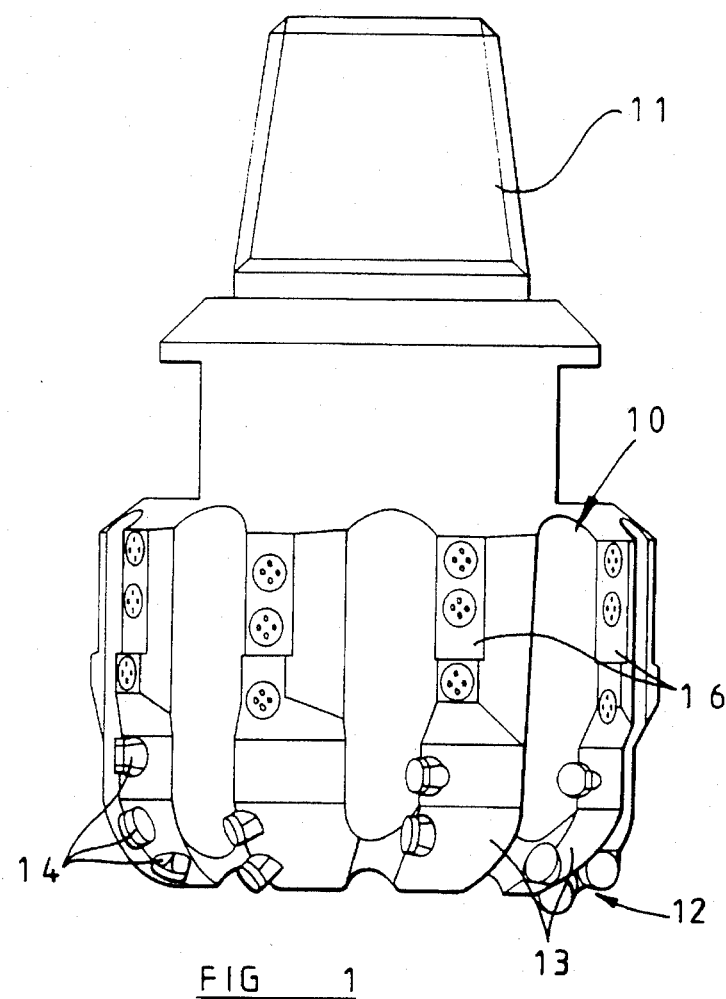
FIG. 1 is a side elevation of a typical drag-type drill bit in which cutting elements according to the present invention may be used.
Figure 2:
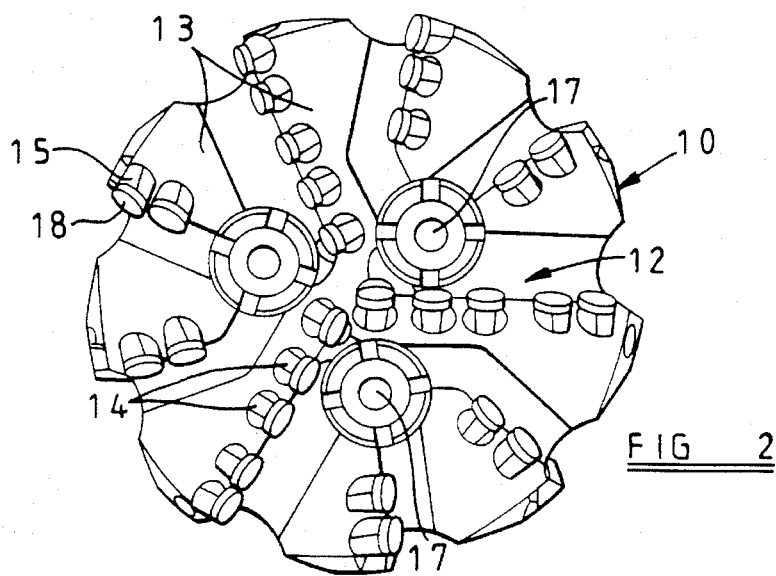
FIG. 2 is an end elevation of the drill bit shown in FIG. 1.

FIGS. 1 and 2 show a typical full bore drag-bit of a kind to which cutting elements of the present invention are applicable. The bit body 10 is machined from steel and has a shank formed with an externally threaded tapered pin 11 at one end for connection to the drill string. The operative end face 12 of the bit body is formed with a number of blades 13 radiating from the central area of the bit, and the blades carry cutter assemblies 14 spaced apart along the length thereof. The bit has a gauge section including kickers 16 which contact the walls of the borehole to stabilize the bit in the borehole. A central passage (not shown) in the bit and shank delivers drilling fluid through nozzles 17 in the end face 12 in known manner.

Figure 3:
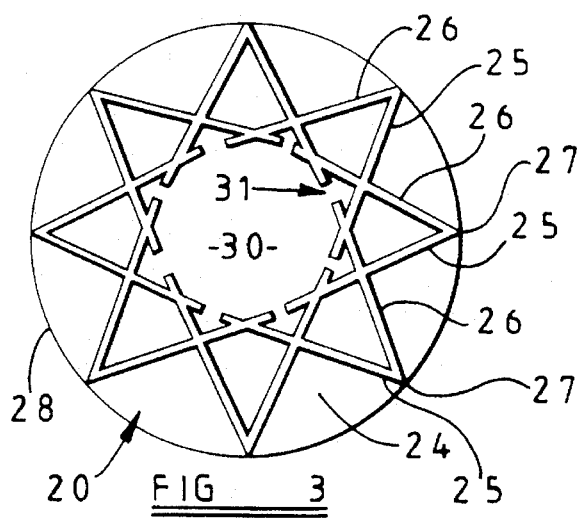
FIG. 3 is an underplan view, on an enlarged scale, of the superhard facing table of a preform cutting element in accordance with the invention, the substrate, which would normally be bonded to the underside of the facing table, being removed to show the configuration of the undersurface of the facing table.
Figure 4:
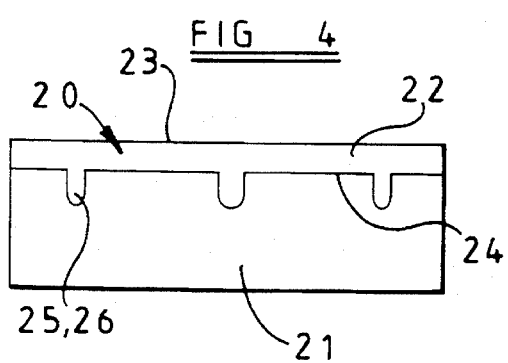
FIG. 4 is a side elevation of a cutting element incorporating the facing table of FIG. 3.

Each cutter assembly 14 comprises a preform cutting element 18 mounted on a carrier 19 in the form of a post which is located in a socket in the bit body. Each preform cutting element is in the form of a circular tablet comprising a facing table of superhard material, usually polycrystalline diamond, bonded to a substrate which is normally of cemented tungsten carbide. The rear surface of the substrate is bonded, for example by LS bonding, to a suitably orientated surface on the post 19. One form of preform cutting element for a rotary drill bit, in accordance with the present invention, is shown in FIGS. 3 and 4. The cutting element is circular and comprises a polycrystalline diamond front facing table 20 bonded to a cemented tungsten carbide substrate 21. The facing table 20 comprises a front flat layer 22 which provides the front cutting face 23 of the facing table. The rear surface 24 of the facing table is formed with an array of ribs 25, 26 which project from the facing table 20 into the substrate 21.

FIG. 3 is a diagrammatic view of the rear surface 24 of the facing table 20, the substrate 21 being removed to show the ribs 25, 26. As may be seen from FIG. 3 there are spaced equally apart around the facing table 20 eight pairs of ribs each pair comprising a rib 25 and a rib 26. The ribs of each pair are arranged in a generally V-shape formation, the apex 27 of the V-shape being located at the periphery 28 of the facing table 20. The ribs 25 and 26 of each pair diverge as they extend inwardly away from the periphery of the facing table.

Figure 5:
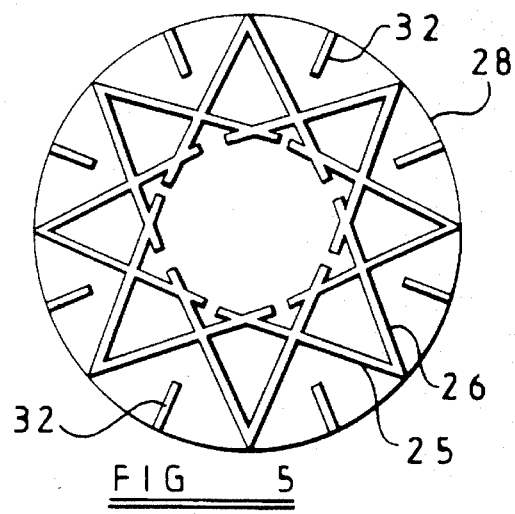
FIGS. 5–13 are further underplan views of the superhard facing table of preform elements, showing diagrammatically further alternative arrangements of formations integrally formed on the underside of the facing table of a preform element.

In the arrangement of FIG. 3, the ribs 25, 26 are straight. Each of the ribs 25 intersects and crosses the ribs 26 of the next two adjacent pairs of ribs and, similarly, each of the ribs 26 intersects and crosses the ribs 25 of the two next adjacent pairs of ribs. The effect of this is to define a generally star-shaped formation of ribs leaving a central area 30 of the rear surface 24 of the facing table free of ribs. In the arrangement shown the inner extremity of each rib 25, 26 is spaced a short distance from the inner extremity of another rib extending from another part of the periphery of the facing table, to provide a gap indicated at 31. In a modified arrangement the extremities of the two ribs may be extended and joined so as to eliminate the gap 31 and form a single continuous rib extending across the facing table. The rear surface 24 of the facing table may bear other ribs in addition to the pairs of diverging ribs. For example, in the arrangement of FIG. 5 there are provided between adjacent pairs of diverging ribs 25, 26 short intermediate ribs 32 which extend inwardly from the periphery 28 in a radial direction. The length of each intermediate rib 32 is such that it stops short of the nearest intersection between the ribs of the adjacent pairs.

Figure 6:
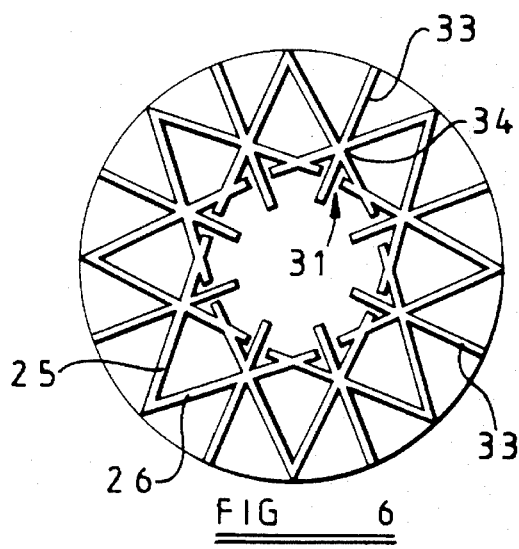
Figure 7:
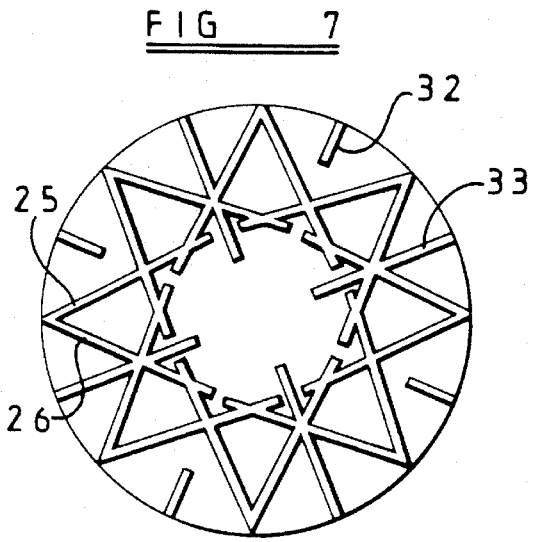

FIG. 6 shows an alternative arrangement where each radial intermediate rib 33 is longer and joins and passes through the intersection 34 between the ribs of the pair of ribs on either side thereof, and also passes through the gap 31. In the case where the gap 31 is eliminated, as previously mentioned, the intermediate rib 33 will intersect and cross the continuous rib so formed. FIG. 7 shows a combination of the arrangements of FIGS. 5 and 6 where a short intermediate rib 32 alternates with a longer intermediate radial rib 33 around the periphery of the element.

Figure 8:
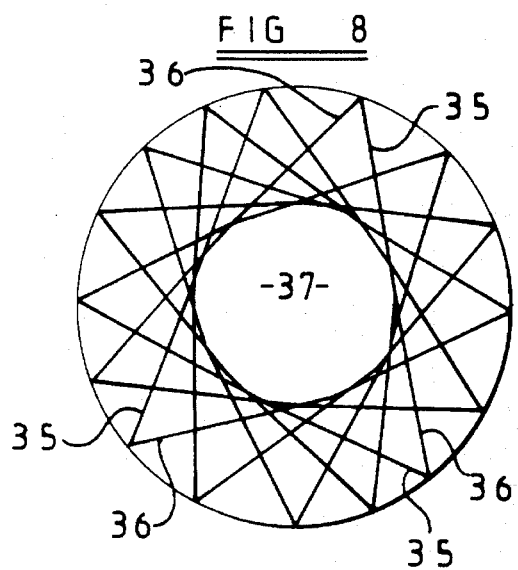

In the arrangements of FIGS. 3–7, there are provided eight pairs of diverging ribs equally spaced around the periphery of the facing table. However, any other suitable number may be provided, and it is not essential for the pairs of ribs to be equally circumferentially spaced. FIG. 8 shows an alterative arrangement where sixteen pairs of diverging ribs 35, 36 are spaced apart around the periphery of the facing table to leave a central area 37 which is free of ribs. In this case the inner extremity of each rib 35 joins the inner extremity of a rib 36 on the other side of the facing table so as to provide a series of ribs which extend continuously from one point on the periphery of the facing table to another point on the periphery.

Figure 9:
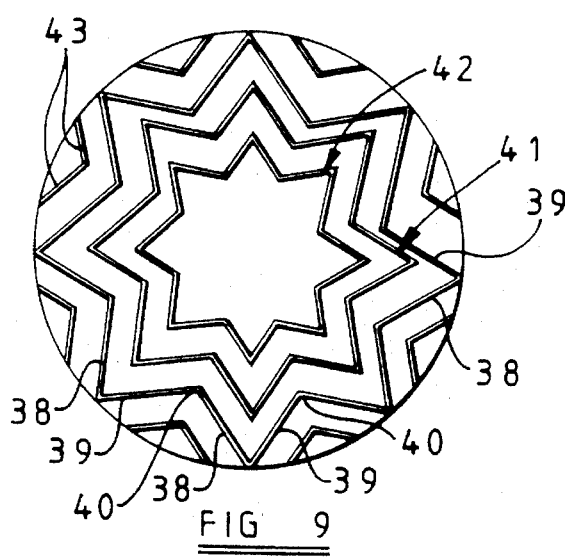

In the further arrangement shown in FIG. 9, there are again provided eight pairs of diverging ribs 38, 39 spaced equally apart around the periphery of the facing table. In this case the inner extremity of each rib 38 meets the inner extremity of the rib 39 of the adjacent pair, as indicated at 40, so that the pairs of diverging ribs 38, 39 form a continuous star-shaped array. Two further similar star-shaped arrays of ribs 41 and 42 are disposed concentrically within the array formed by the ribs 38, 39. Pairs of converging intermediate ribs 43 extend from the periphery of the facing table midway between adjacent pairs of ribs 38, 39.

Figure 10:
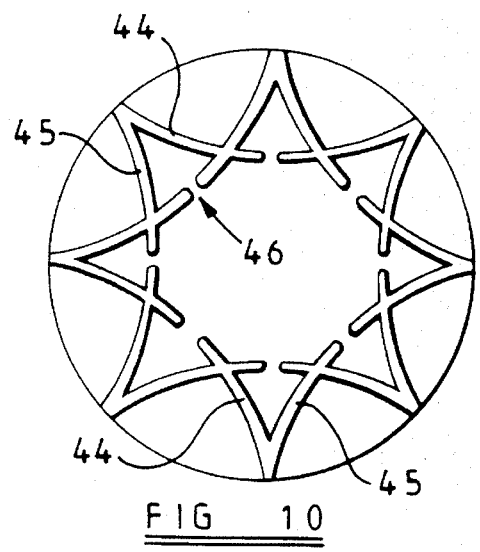

FIG. 10 shows a further arrangement in which each pair of diverging ribs comprises arcuately curved ribs 44, 45 which curve outwardly away from one another as they extend inwardly away from the periphery of the facing table. In this case each rib intersects and crosses only one rib of the adjacent pair of ribs. There is a gap 46 between the inner extremity of each rib 45 and the adjacent extremity of the rib 44 on the next-but-one pair of ribs around the periphery of the facing table. As in the previously described arrangements, however, the extremities of the two ribs may be joined, to eliminate the gap 46, and thus provide a continuous curved rib extending from one point on the periphery of the facing table to another point on the periphery.

Figure 11:
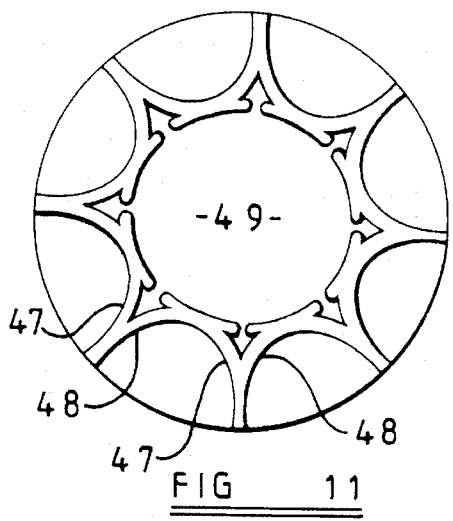

FIG. 11 shows a modification of the arrangement of FIG. 10 in which the ribs 47, 48 of each pair of ribs are generally S-shaped so that the ribs are substantially tangential where they meet at the periphery of the facing table, and so that the inner extremity of each rib lies on an imaginary circle bounding the rib-free inner region 49 of the facing table.

Figure 12:
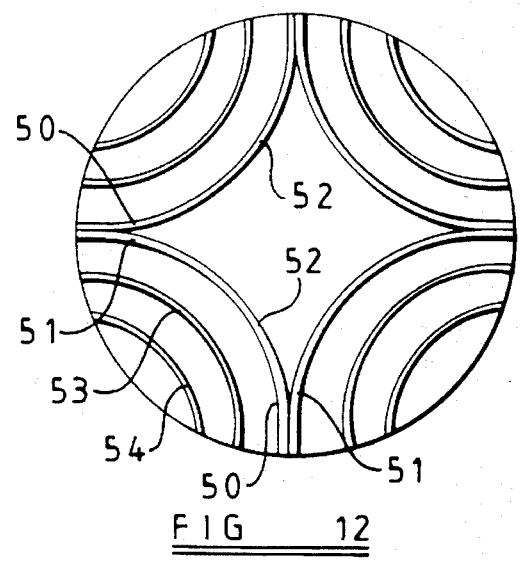

In the embodiment of FIG. 12 there are provided only four pairs of curved diverging ribs 50, 51 spaced equally apart around the periphery of the facing table. The inner extremity of each rib 50 joins the inner extremity of the rib 51 of the adjacent pair so as to provide a continuous arcuate rib 52 extending from one point on the periphery of the facing table to another. Intermediate ribs 53 and 54 lie within each continuous rib 52 and extend generally parallel thereto.

Figure 13:
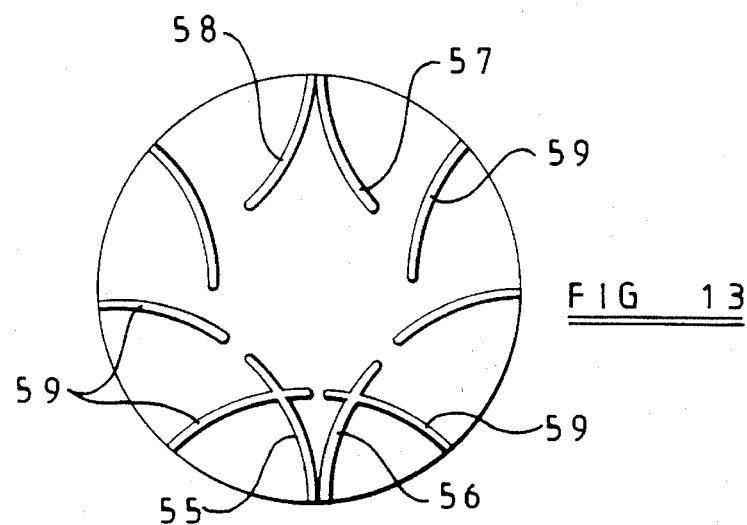

FIG. 13 shows a non-symmetrical arrangement where there are provided only two pairs of diverging curved ribs 55, 56 and 57, 58, the ribs extending from diametrically opposed locations on the periphery of the facing element. Three curved intermediate ribs 59 extend inwardly from the periphery at equally spaced locations between the two diametrically opposed pairs of ribs. Each intermediate rib 59 curves away from the pair of ribs 57, 58 and towards the pair of ribs 55, 56. The ribs 59 next adjacent the pair of ribs 55, 56 intersect the ribs 55 and 56 respectively.

All of the above described arrangements provide mechanical interlocking between the facing table and substrate and may thus inhibit spalling or delamination of the facing table in use. In the case where the preform element is for use as a cutting element, for example in a rotary drill bit, the ribs may also serve to strengthen the cutting edge against wear and impact damage. Also, as the cutting element wears, the ends of the ribs at the cutting edge become exposed and project, and thus may enhance the cutting effect on the formation being cut.

Where the configuration of the ribs is symmetrical, the cutting element may be arranged in any rotational orientation. With a non-symmetrical arrangement, however, the cutting element may require to be orientated so that the desired portion of the periphery of the element serves as the cutting edge.

In all of the described arrangements each diverging pair of ribs is generally V-shaped, with the apex of the V-shape being located at the periphery of the facing table. However, this is not essential, and the outer extremities of the diverging ribs may be spaced apart at the periphery of the facing table. Although it is preferred for the outer extremities of the ribs to be located at the periphery of the facing table, the invention also includes within its scope arrangements where the outer extremities of the ribs are spaced slightly inwardly from the outer periphery of the facing table.

The ribs have been shown as parallel-sided, but in some cases the ribs may vary in width along their length. The ribs may also vary in depth along their length and different ribs may be of different depths. Generally speaking, however, the ribs are preferably generally deeper towards the periphery of the preform element so as to provide improved locking between the facing table and the substrate nearer the periphery of the element. The ribs may be parallel-sided in cross section, with a rounded lower edge, as shown in FIG. 4, or they may be tapered inwardly or outwardly as they extend into the substrate from the rear surface of the facing table.

In any of the arrangements according to the invention the rear surface of the facing table may be formed around its periphery with a ring or wall extending into the substrate, the outer extremities of the ribs meeting or intersecting the surrounding ring or wall. The ring or wall may be of greater or lesser depth than the outer extremities of the ribs.

In any of the above-described arrangements in accordance with the invention a transition layer may be provided between the facing table and the substrate. The transition layer may, for example, comprise polycrystalline diamond particles embedded in a tungsten carbide matrix.

Whereas the present invention has been described in particular relation to the drawings attached hereto, it should be understood that other and further modifications, apart from those shown or suggested herein, may be made within the scope and spirit of the present invention.

I claim:

1. A preform element including a facing table of superhard material having a front face, a periphery, and a rear surface bonded to a substrate which is less hard than the superhard material, the rear surface of the facing table being formed with an array of elongate ribs which project from the facing table into the substrate, the array comprising a plurality of pairs of ribs spaced substantially equally apart around the facing table, the ribs of each pair being arranged in a generally V-shape formation with the apex of the V-shape located adjacent the periphery of the facing table so that the ribs diverge as they extend inwardly away from said periphery, and wherein each rib of a pair of diverging ribs meets and joins a rib of an adjacent pair of diverging ribs.

2. A preform element according to claim 1, wherein the ribs of each pair of diverging ribs are substantially straight.

3. A preform element according to claim 1, wherein the ribs of each pair are curved, and curve away from one another as they extend inwardly from the periphery of the facing table.

4. A preform element according to claim 1, wherein each rib of a pair of diverging ribs extends across a rib of an adjacent pair of diverging ribs.

5. A preform element according to claim 1, wherein at least one rib of one pair of diverging ribs is joined end-toend with a rib of another pair of diverging ribs to form a continuous rib extending across the facing table.

6. A preform element according to claim 1, wherein there is provided, between two adjacent pairs of diverging ribs, one or more intermediate ribs, not forming part of a pair of diverging ribs, which extend inwardly away from the periphery of the facing table.

7. A preform element according to claim 6, wherein said intermediate ribs extend substantially normally to the periphery of the facing table.

8. A preform element according to claim 6, wherein at least one said intermediate ribs joins a rib of an adjacent pair of diverging ribs.

9. A preform element according to claim 1, wherein an inner area of the rear surface of the facing table is free of ribs.

10. A preform element according to claim 1, wherein the element is substantially circular and said pairs of diverging ribs are substantially symmetrical about the centre of the facing table.

11. A preform element according to claim 10, wherein there are provided eight pairs of diverging ribs spaced substantially equally apart around the periphery of the facing table.

12. A preform element according to claim 10, wherein there are provided sixteen pairs of diverging ribs spaced substantially equally apart around the periphery of the facing table.

* * * * *